United States Patent
Nomura

(10) Patent No.: US 10,839,272 B2
(45) Date of Patent: Nov. 17, 2020

(54) IMAGE FORMING APPARATUS THAT PRINTS IMAGE FORMING DATA INCLUDING SENTENCES IN PLURALITY OF LANGUAGES, ON RECORDING MEDIUM

(71) Applicant: KYOCERA Document Solutions Inc., Osaka (JP)

(72) Inventor: Kazuma Nomura, Osaka (JP)

(73) Assignee: KYOCERA Document Solutions Inc., Tamatsukuri (JP)

(*) Notice: Subject to any disclaimer, the term of this patent is extended or adjusted under 35 U.S.C. 154(b) by 0 days.

(21) Appl. No.: 16/726,386

(22) Filed: Dec. 24, 2019

(65) Prior Publication Data
US 2020/0210791 A1 Jul. 2, 2020

(30) Foreign Application Priority Data
Dec. 28, 2018 (JP) .................................. 2018-248500

(51) Int. Cl.
*G06K 15/00* (2006.01)
*G06K 15/02* (2006.01)

(52) U.S. Cl.
CPC ....... *G06K 15/1822* (2013.01); *G06K 15/186* (2013.01); *G06K 15/188* (2013.01)

(58) Field of Classification Search
None
See application file for complete search history.

(56) References Cited

U.S. PATENT DOCUMENTS

| 6,760,887 B1* | 7/2004 | Taieb | G06F 40/109 715/269 |
| 8,542,953 B2* | 9/2013 | Maekawa | G06K 9/6842 382/321 |
| 2009/0112845 A1* | 4/2009 | Byers | G06F 16/338 |
| 2011/0252316 A1* | 10/2011 | Pahud | G06F 40/58 715/264 |
| 2018/0113859 A1* | 4/2018 | Kodimer | H04N 1/00411 |
| 2018/0302520 A1* | 10/2018 | Anbalagan | H04N 1/00514 |
| 2019/0095709 A1* | 3/2019 | Hara | H04N 1/40 |
| 2019/0191044 A1* | 6/2019 | Ghodke | G06K 9/325 |
| 2020/0082218 A1* | 3/2020 | Hoehne | G06N 3/08 |
| 2020/0213459 A1* | 7/2020 | Miyai | H04N 1/00331 |

FOREIGN PATENT DOCUMENTS

JP 2000-089926 A 3/2000

* cited by examiner

*Primary Examiner* — Dung D Tran
(74) *Attorney, Agent, or Firm* — IP Business Solutions, LLC

(57) ABSTRACT

An image forming apparatus includes a control device and an image forming device. The control device acts as an acquirer, an inclusion decider, a visibility decider, and a form changer. The acquirer acquires user language information. The inclusion decider decides whether the image forming data includes the user's language indicated by the user language information. The visibility decider decides a level of visibility of a portion of the image forming data described in the user's language, according to a predetermined criteria of inappropriateness. The form changer changes a display form of the portion of the image forming data described in the user's language to a different display form, when it is decided that the visibility corresponds to the criteria of inappropriateness. The image forming device forms an image based on the image forming data in the display form changed, on a recording medium.

7 Claims, 9 Drawing Sheets

CASE OF USER'S LANGUAGE (JAPANESE) AND COGNATE LANGUAGE (CHINESE)

<ORIGINAL IMAGE FORMING DATA>

日本は素晴らしい国です。日本は素晴らしい国です。日本は素晴らしい国です。日本は素晴らしい国です。

中国是一个美好的国家。中国是一个美好的国家。中国是一个美好的国家。中国是一个美好的国家。

<HIGHLIGHTED IMAGE FORMING DATA>
CHANGE ONLY JAPANESE TO RED FROM BLACK

*日本は素晴らしい国です。日本は素晴らしい国です。日本は素晴らしい国です。日本は素晴らしい国です。*

中国是一个美好的国家。中国是一个美好的国家。中国是一个美好的国家。中国是一个美好的国家。

Fig.6A CASE OF USER'S LANGUAGE (JAPANESE) AND COGNATE LANGUAGE (CHINESE)
<HIGHLIGHTED IMAGE FORMING DATA>
CHANGE ONLY JAPANESE TO RED FROM BLACK
<ORIGINAL IMAGE FORMING DATA>

Fig.6B

CASE OF USER'S LANGUAGE (JAPANESE) AND DISSIMILAR LANGUAGE (ENGLISH)

<IMAGE FORMING DATA WITHOUT HIGHLIGHTING>
JAPANESE AND ENGLISH UNCHANGED

日本は素晴らしい国です。日本は素晴らしい国です。日本は素晴らしい国です。……

UNITED KINGDOM IS A WONDERFUL COUNTRY. UNITED KINGDOM IS A WONDERFUL COUNTRY. UNITED KINGDOM IS A WONDERFUL COUNTRY. UNITED KINGDOM IS A WONDERFUL COUNTRY. ……

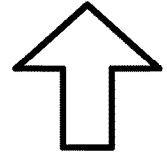

<ORIGINAL IMAGE FORMING DATA>

日本は素晴らしい国です。日本は素晴らしい国です。日本は素晴らしい国です。……

UNITED KINGDOM IS A WONDERFUL COUNTRY. UNITED KINGDOM IS A WONDERFUL COUNTRY. UNITED KINGDOM IS A WONDERFUL COUNTRY. UNITED KINGDOM IS A WONDERFUL COUNTRY. ……

Fig.7A  CASE OF LANGUAGE (ENGLISH) OTHER THAN USER'S LANGUAGE (JAPANESE) OCCUPIES 3/4 OR MORE

<ORIGINAL IMAGE FORMING DATA>

日本は素晴らしい国です。日本は素晴らしい国です。日本は素晴らしい国です。日本は素晴らしい国です。

UNITED KINGDOM IS A WONDERFUL COUNTRY. UNITED KINGDOM IS A WONDERFUL COUNTRY. UNITED KINGDOM IS A WONDERFUL COUNTRY. UNITED KINGDOM IS A WONDERFUL COUNTRY.

1/4    3/4

<HIGHLIGHTED IMAGE FORMING DATA>
CHANGE ONLY JAPANESE TO RED FROM BLACK

日本は素晴らしい国です。日本は素晴らしい国です。日本は素晴らしい国です。日本は素晴らしい国です。

UNITED KINGDOM IS A WONDERFUL COUNTRY. UNITED KINGDOM IS A WONDERFUL COUNTRY. UNITED KINGDOM IS A WONDERFUL COUNTRY.

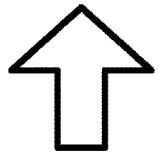

Fig.7B CASE OF USER'S LANGUAGE (JAPANESE) AND DISSIMILAR LANGUAGE (ENGLISH) ARE ALTERNATELY ARRANGED

<HIGHLIGHTED IMAGE FORMING DATA>
CHANGE ONLY JAPANESE TO RED FROM BLACK

日本は素晴らしい国です。
UNITED KINGDOM IS A WONDERFUL COUNTRY.
日本は素晴らしい国です。
UNITED KINGDOM IS A WONDERFUL COUNTRY.
............
日本は素晴らしい国です。
UNITED KINGDOM IS A WONDERFUL COUNTRY.

<ORIGINAL IMAGE FORMING DATA>

日本は素晴らしい国です。
UNITED KINGDOM IS A WONDERFUL COUNTRY.
日本は素晴らしい国です。
UNITED KINGDOM IS A WONDERFUL COUNTRY.
............
日本は素晴らしい国です。
UNITED KINGDOM IS A WONDERFUL COUNTRY.

IMAGE FORMING APPARATUS THAT PRINTS IMAGE FORMING DATA INCLUDING SENTENCES IN PLURALITY OF LANGUAGES, ON RECORDING MEDIUM

INCORPORATION BY REFERENCE

This application claims priority to Japanese Patent Application No. 2018-248500 filed on Dec. 28, 2018, the entire contents of which are incorporated by reference herein.

BACKGROUND

The present disclosure relates to an image forming apparatus, and in particular to a technique to print, when printing image forming data including sentences of a plurality of languages, a sentence described in a user's language in a different display form from the remaining sentences.

A printing apparatus is known that can change, when printing a text file, the font of a specific word in the text file. In this apparatus, the specific word and the corresponding display font are registered as a reserved word by the user in advance, so that the reserved word is printed in the registered font, when the inputted text file includes the reserved word.

SUMMARY

The disclosure proposes a further improvement of the foregoing technique. In an aspect, the disclosure provides an image forming apparatus including a reception device, a control device, and an image forming device. The reception device receives image forming data including sentences of a plurality of languages. The control device includes a processor, and acts, when the processor executes a control program, as an acquirer, an inclusion decider, a visibility decider, and a form changer. The acquirer acquires user language information indicating a predetermined language familiar to the user. The inclusion decider decides whether the image forming data received by the reception device includes the user's language indicated by the user language information acquired by the acquirer. The visibility decider decides, when the inclusion decider decides that the received image forming data includes the user's language, a level of visibility of a portion of the received image forming data described in the user's language, according to a predetermined criteria of inappropriateness. The form changer changes a display form of the portion of the received image forming data described in the user's language to a different display form, when the visibility decider decides that the visibility corresponds to the predetermined criteria of inappropriateness. The image forming device forms an image based on the image forming data in the display form changed by the form changer, on a recording medium.

BRIEF DESCRIPTION OF THE DRAWINGS

FIG. 6A is a schematic drawing showing an example of image forming data in which the user's language is highlighted, when the original image forming data includes a language cognate to the user's language.

FIG. 6B is a schematic drawing showing an example of image forming data in which the user's language remains unchanged, when the original image forming data does not include a language cognate to the user's language.

FIG. 7A is a schematic drawing showing an example of image forming data in which the user's language is highlighted, when three quarters or more of the data is composed of languages other than the user's language.

FIG. 7B is a schematic drawing showing an example of image forming data in which the user's language is highlighted, when the user's language and dissimilar languages are alternately located.

DETAILED DESCRIPTION

Figure 1:
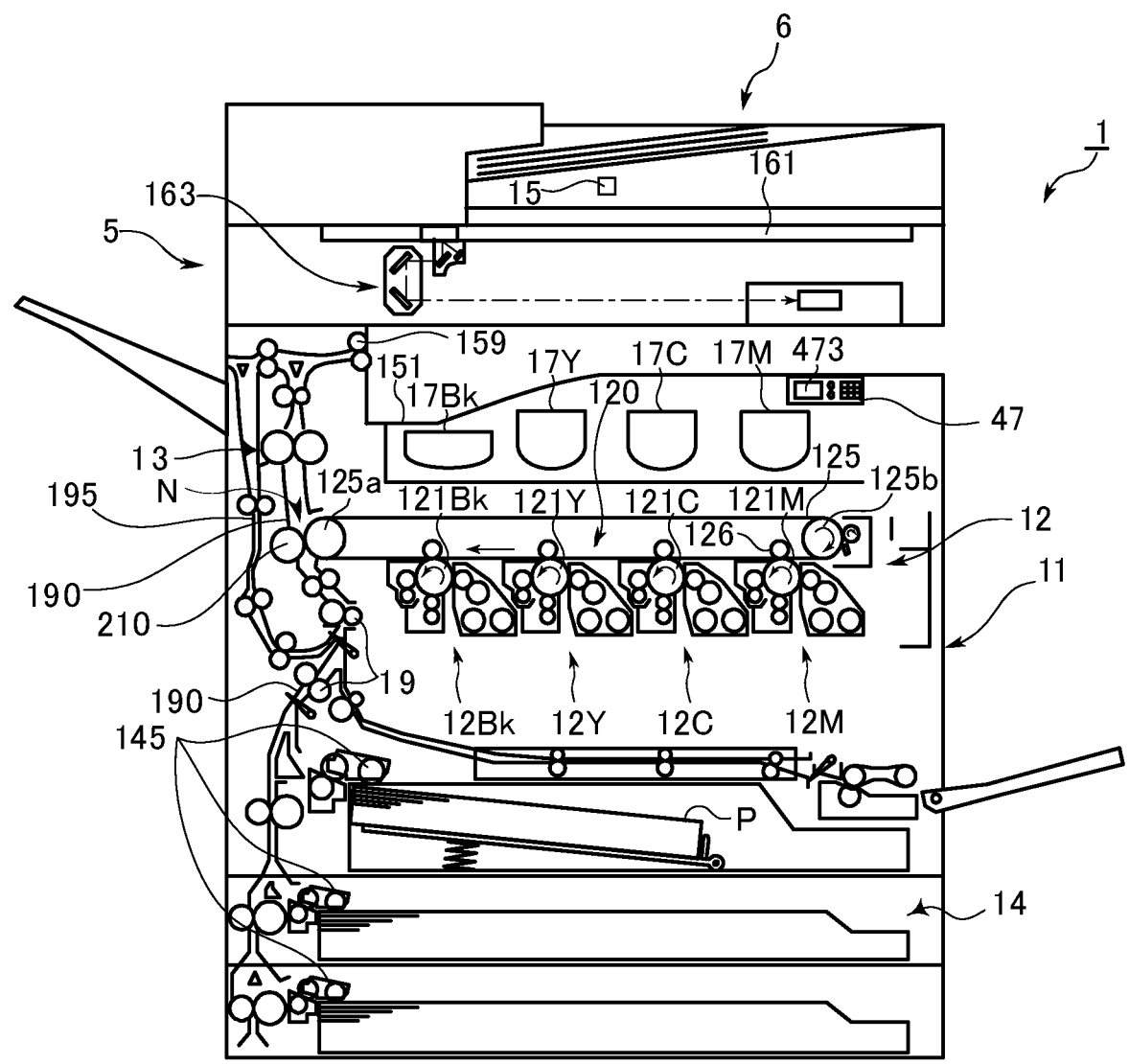
FIG. 1 is partially cut away, schematic front view showing a configuration of an image forming apparatus according to an embodiment of the disclosure.

Hereafter, an image forming apparatus according to an embodiment of the disclosure will be described, with reference to the drawings. FIG. 1 is partially cut away, schematic front view showing a configuration of the image forming apparatus according to the embodiment of the disclosure. The image forming apparatus 1 is a multifunction peripheral having a plurality of functions, such as copying, printing, scanning, and facsimile transmission, and includes an operation device 47, a document feeding device 6, and a document reading device 5, which are provided in a main body 11.

The operation device 47 receives instructions from the user to execute the functions and operations that the image forming apparatus 1 is configured to perform, for example the image forming operation and the image reading operation. The operation device 47 includes a display device 473 for displaying, for example, an operation guide for the user.

To perform the document reading operation, the image forming apparatus 1 operates as follows. The document reading device 5 having a reading mechanism 163 optically reads the image on a source document delivered from the document feeding device 6 or placed on a platen glass 161, and generates image forming data. The image forming data generated by the document reading device 5 is stored in a hard disk drive (HDD) 92 (see FIG. 2) or, for example, a computer connected to a network.

To perform the image forming operation, the image forming apparatus 1 operates as follows. An image forming device 12 forms a toner image on a recording medium, in this case a recording sheet P delivered from a paper feeding device 14, on the basis of the image forming data generated through the document reading operation, stored in the HDD 92, or received from the computer connected to the network.

The image forming device 12 includes an image forming unit 12Bk for black (Bk), an image forming unit 12Y for yellow (Y), an image forming unit 12C for cyan (C), and an image forming unit 12M for magenta (M). The image forming units 12Bk, 12Y, 12C, and 12M respectively includes photoconductor drums 121Bk, 121Y, 121C, and 121M, which are driven to rotate counterclockwise in FIG. 1.

The toner containers 17Bk, 17Y, 17C, and 17M are for storing the toner of black, yellow, cyan, and magenta respectively, and detachably mounted on a non-illustrated toner container base, located above the photoconductor drums 121Bk, 121Y, 121C, 121M at an upper portion of the main body 11, with an intermediate transfer belt 125 interposed therebetween.

The transfer device 120 includes the intermediate transfer belt 125, on the circumferential surface of which the toner image is to be transferred, a drive roller 125a, a slave roller 125b, and a primary transfer roller 126.

The intermediate transfer belt 125 is wound over the drive roller 125a and the slave roller 125b, to be driven by the drive roller 125a so as to endlessly run in contact with the circumferential surface of the photoconductor drums 121Bk, 121Y, 121C, and 121M, in synchronization therewith.

To perform the color printing operation, the image forming apparatus 1 operates as follows. The periphery of the photoconductor drums 121Bk, 121Y, 121C, and 121M is uniformly charged (charging process), the surface of the photoconductor drums 121Bk, 121Y, 121C, and 121M bearing the electric charge is irradiated with a laser beam according to the image forming data, to form a latent image (exposure process), the latent image is visualized by the toner (developing process), and the toner image formed by the visualization is transferred onto the intermediate transfer belt 125, by the primary transfer roller 126.

The toner images of the respective colors (black, yellow, cyan, and magenta), to be transferred to the intermediate transfer belt 125, are superposed on each other at an adjusted timing on the intermediate transfer belt 125, so as to form a colored toner image.

A secondary transfer roller 210 transfers the colored toner image formed on the surface of the intermediate transfer belt 125 onto the recording sheet P transported along a transport route 190 from the paper feed device 14, at a nip region N of a drive roller 125a engaged with the intermediate transfer belt 125. The description thus far given is related to the color printing. In the case of monochrome printing, the photoconductor drums 121Y, 121C, and 121M for yellow, cyan, and magenta are not employed but only the photoconductor drum 121Bk for black is employed.

A fixing device 13 then fixes the toner image on the recording sheet P, by heat pressing. The recording sheet P having the colored image formed and fixed thereon is discharged to an output tray 151.

The paper feed device 14 includes a plurality of paper cassettes, and pickup rollers 145 provided for the respective cassettes to pick up the recording sheets stored therein, and is configured to pick up the recording sheet of the size designated by the user by rotating the corresponding pickup roller 145, and transport the designated recording sheet toward the nip region N.

Figure 2:
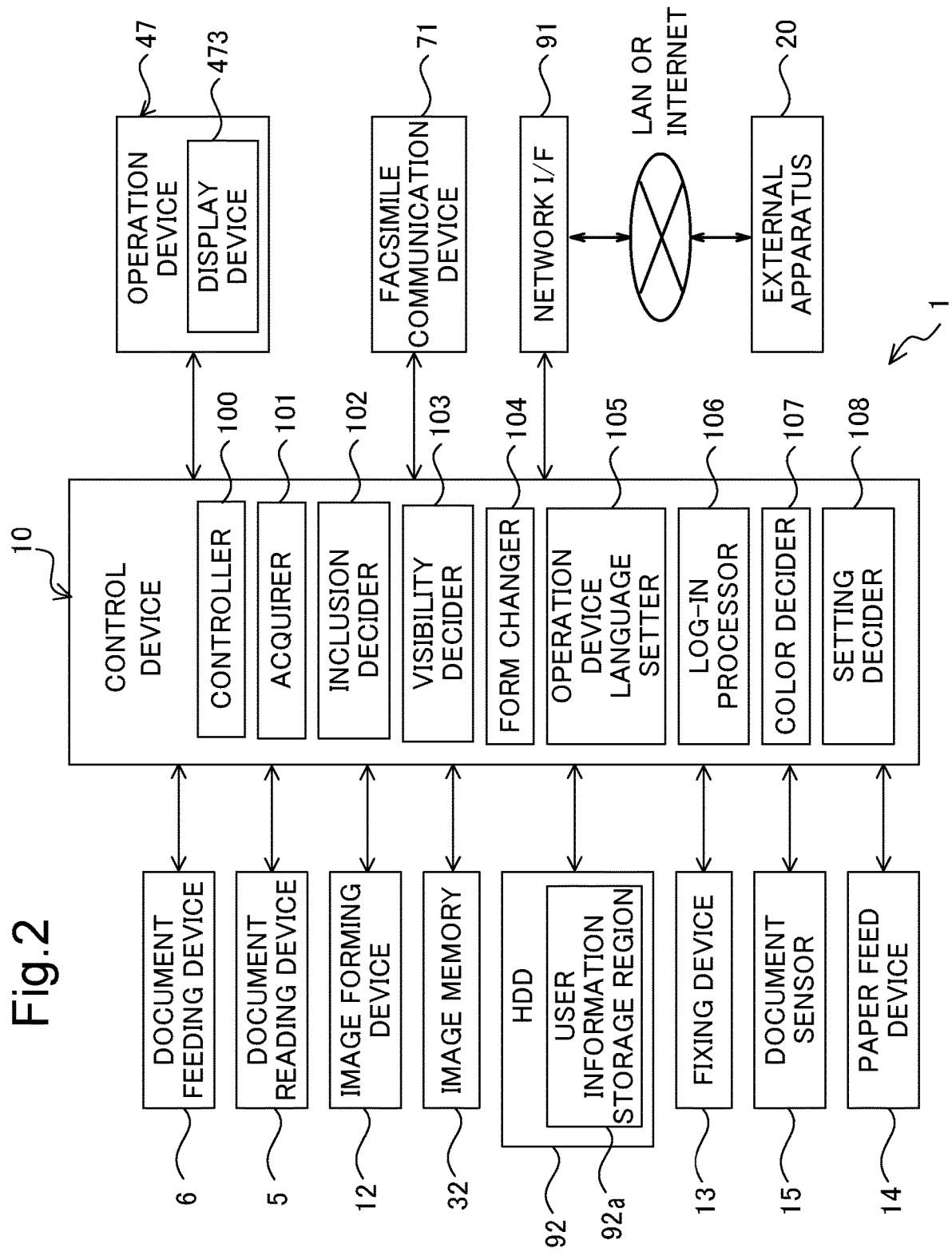
FIG. 2 is a functional block diagram schematically showing an essential internal configuration of the image forming apparatus according to the embodiment.

FIG. 2 is a functional block diagram schematically showing an essential internal configuration of the image forming apparatus 1. The image forming apparatus 1 includes a control device 10, the document feeding device 6, the document reading device 5, the image forming device 12, an image memory 32, the HDD 92, the fixing device 13, a document sensor 15, the operation device 47, a facsimile communication device 71, and a network interface (I/F) 91. The elements same as or similar to those of the image forming apparatus 1 shown in FIG. 1 are given the same numeral, and detailed description of such elements will not be repeated.

The document feeding device 6 delivers the source document to be read, to the document reading device 5.

The document reading device 5 includes a non-illustrated reading mechanism having a light emitter and a charge coupled device (CCD) sensor, and is configured to illuminate the source document with the light emitter and detect the reflected light with the CCD sensor, thereby reading the image of the source document, under the control of the controller 100 of the control device 10. Thus, the document reading device 5 acquires the image forming data by reading the image from the source document. Here, the document reading device 5 exemplifies the reception device in What is claimed is.

The image forming device 12 forms the toner image representing the image to be printed, on the recording sheet.

The image memory 32 is a region for temporarily storing, for example, the image forming data acquired through the reading operation of the document reading device 5, and the data to be printed by the image forming device 12.

The HDD 92 is a large-capacity storage device, for example for storing the image forming data acquired through the reading operation of the document reading device 5.

The fixing device 13 fixes the toner image formed on the recording sheet, by heat pressing.

The document sensor 15 is located close to a document inlet of the document feeding device 6, to detect the presence of the source document set in the document tray of the document feeding device 6.

The display device 473 of the operation device 47 possesses a touch panel function, so that the user can operate the image forming apparatus 1 through the touch panel function, by touching buttons and keys displayed on the screen.

The facsimile communication device 71 includes a codec, a modem, and a network control unit (NCU), which are not shown, to perform facsimile transmission through a public telephone network. For example, the facsimile communication device 71 receives the image forming data received via the facsimile communication. The facsimile communication device 71 also exemplifies the reception device in What is claimed is.

The network I/F 91 includes a communication module such as a local area network (LAN) board, to transmit and receive various data, via the LAN connected to the network I/F 91, to and from an external apparatus such as a personal computer in the local area or on the internet. For example, the network I/F 91 receives the image forming data included in a print job received from the external apparatus 20. The network I/F 91 also exemplifies the reception device in What is claimed is.

The control device 10 includes a processor, a random-access memory (RAM), a read-only memory (ROM), and an exclusive hardware circuit. The processor is, for example, a central processing device (CPU), an application specific integrated circuit (ASIC), a micro processing device (MPU), or a graphics processing unit (GPU). The control device 10 includes a controller 100 that controls the overall operation of the image forming apparatus 1, an acquirer 101, an inclusion decider 102, a visibility decider 103, a form changer 104, an operation device language setter 105, a log-in processor 106, a color decider 107, and a setting decider 108.

The control device 10 acts, by operating according to a control program installed in the HDD 92, as the controller 100, the acquirer 101, the inclusion decider 102, the visibility decider 103, the form changer 104, the operation device language setter 105, the log-in processor 106, the color decider 107, and the setting decider 108. Here, the controller 100 and other components cited above may each be constituted in the form of a hardware circuit, instead of being realized by the control device 10 according to the control program. This also applies to other embodiments, unless otherwise specifically noted.

The controller 100 is connected to the document feeding device 6, the document reading device 5, the image forming device 12, the image memory 32, the HDD 92, the fixing device 13, the document sensor 15, the operation device 47, the facsimile communication device 71, and the network I/F 91, to control the operation of the mentioned components. Whereas the image forming apparatus 1 is configured to perform a plurality of functions, such as copying, printing, scanning, and facsimile transmission, the controller 100 controls the operation related to the plurality of functions.

In the HDD 92, text data of a plurality of languages, and operation device language information indicating the language displayed on the display device 473 (e.g., Japanese, English, Chinese, and so forth) are stored in advance.

Figure 3:
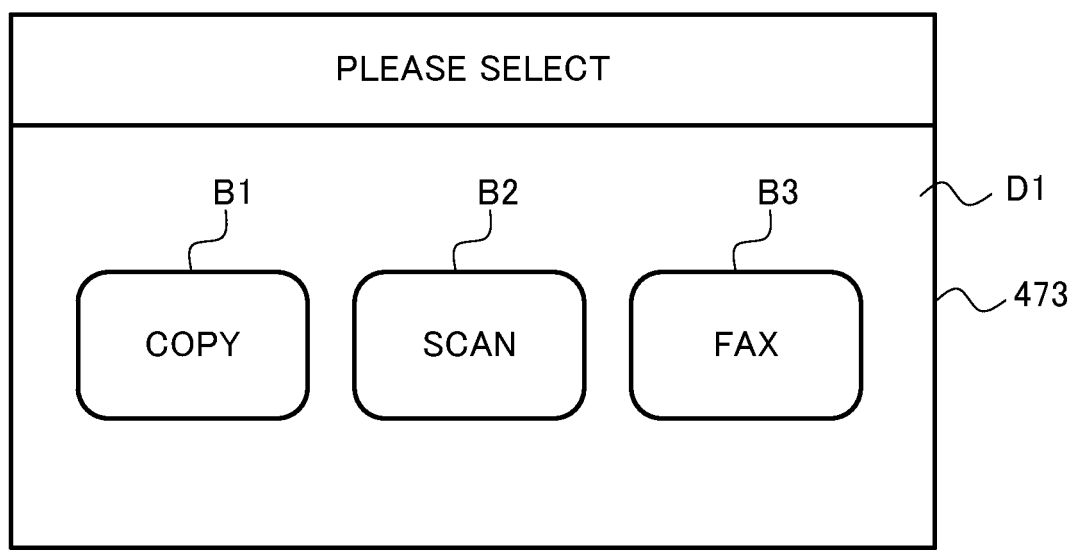
FIG. 3 is a schematic drawing showing an example of an operation screen displayed on a display device of an operation device.

The operation device language setter 105 sets the language to be displayed on the display device 473 of the operation device 47 to the language designated through the operation of the user. For example, when the user selects "Japanese" through the operation device 47, the operation device language setter 105 sets the language to be displayed on the display device 473 of the operation device 47 to "Japanese". The controller 100 utilizes the text data in Japanese out of the plurality of languages stored in the HDD 92, to display items related to the operation through the display device 473 in Japanese. As shown in FIG. 3, the items related to the operation are displayed in Japanese, on an operation screen D1 of the display device 473. For example, select buttons B1 to B3, respectively corresponding to the copying function, the scanning function, and the facsimile function, are displayed in Japanese, on the operation screen D1 of the display device 473.

The HDD 92 includes a user information storage region 92a. In the user information storage region 92a, log-in information including identification information and a password exclusive to the legitimate user, for decision whether to permit the log-in in the image forming apparatus 1, and user language information indicating a predetermined language familiar to the user (hereinafter, "user's language" as the case may be) corresponding to the identification information, are stored in advance, in association with each other. In other words, the information of qualified persons authorized to use the image forming apparatus 1, and the language familiar to the qualified person, are stored in advance in the user information storage region 92a.

Figure 4:
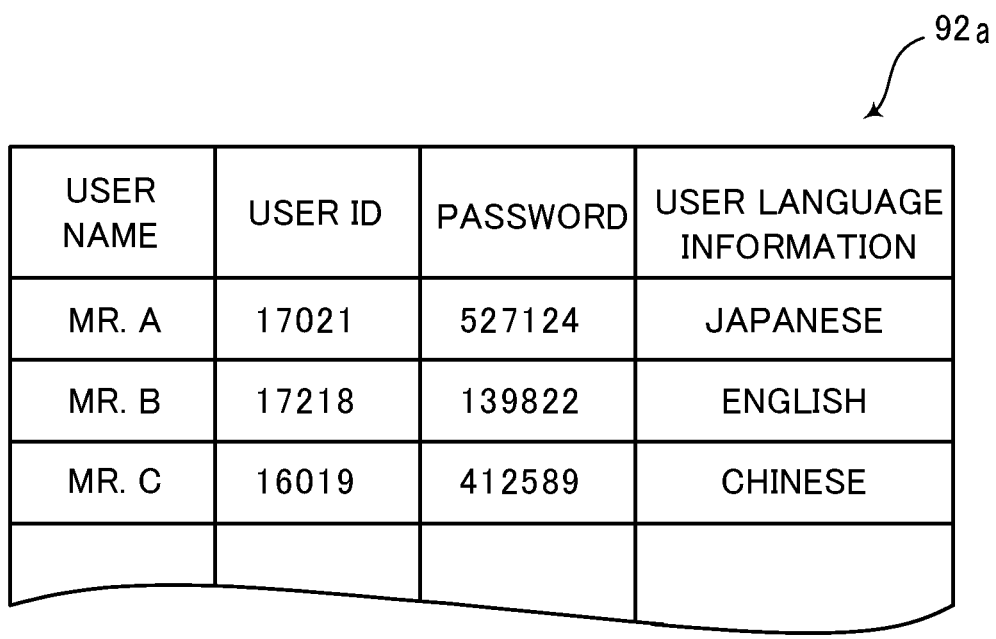
FIG. 4 is a cross-reference table showing an example of data structure of a user information storage region.

FIG. 4 is a cross-reference table showing an example of data structure of the user information storage region 92a. The log-in information stored in the user information storage region 92a includes a user ID (log-in name) and a password, which are the identification code exclusive to the user necessary for logging in in the image forming apparatus 1. The log-in information may further include the name of the qualified person. The user language information refers to the information indicating the user's language, which is stored in association with each of the log-in information, as shown in FIG. 4. For example, when the user name is Mr. A, "17021" is stored as the user ID (log-in name), "527124" is stored as the password, and "Japanese" is stored as the language information of Mr. A. Here, the user information storage region 92a exemplifies the storage device in What is claimed is.

The log-in processor 106 permits the user to log in in the image forming apparatus 1, upon deciding that the log-in information inputted by the user in the operation device 47 accords with the log-in information stored in the HDD 92. To be more detailed, the log-in processor 106 acquires the log-in name (user ID) and the password inputted by the user in the operation device 47 through the authentication screen displayed on the display device 473, and collates the user ID and the password thus acquired with the user ID and the password stored in the user information storage region 92a of the HDD 92, to thereby decide whether the user who has inputted the user ID and the password is the qualified person authorized to use the image forming apparatus 1. The log-in processor 106 also turns on the user identification flag for identifying the log-in information of the user currently permitted to log in, and stores the flag in the user information storage region 92a.

The acquirer 101 acquires the user language information indicating the user's language. To be more detailed, when the log-in processor 106 permits the user to log in in the image forming apparatus 1, the acquirer 101 acquires the user language information associated with the log-in information from the user information storage region 92a, irrespective of the language indicated by the operation device language information designated by the user through the operation device 47. For example, when Mr. A has logged in in the image forming apparatus 1, the acquirer 101 searches the user information storage region 92a to identify the log-in information, about which the user identification flag is turned on, and acquires the user language information corresponding to the log-in information (in this example, the user ID of Mr. A). Thus, the acquirer 101 acquires "Japanese", corresponding to the language information of Mr. A.

When the user language information is not stored in the user information storage region 92a, and therefore the user language information is unable to be acquired, or when the log-in processor 106 has rejected the log-in in the image forming apparatus 1 (e.g., the inputted log-in information does not accord with the log-in information stored in the user information storage region 92a) the acquirer 101 acquires the current operation device language information stored in the HDD 92 designated by the user through the operation device 47 (i.e., operation device language information of the language displayed on the display device 473).

The inclusion decider 102 decides whether the user's language indicated by the user language information acquired by the acquirer 101 is included in the image forming data received by the facsimile communication device 71 through the facsimile communication, the image forming data included in the print job received by the network I/F 91, or the image forming data acquired through the reading operation of the document reading device 5.

To be more detailed, when the document reading device 5 serves as the reception device, the image forming data acquired through the reading operation of the document reading device 5 is stored in the HDD 92. When the facsimile communication device 71 or the network I/F 91 serves as the reception device, the image forming data received by the facsimile communication device 71 or the network I/F 91 is stored in the image memory 32 (or HDD 92). When the document reading device 5 serves as the reception device, the inclusion decider 102 recognizes characters in the image forming data, through pattern matching between an image including known fonts, acquired through optical character recognition (OCR) of the image forming data stored in the image memory 32 or HDD 92, and an image of characters in the image forming data acquired by the document reading device 5, and decides whether the language of the characters recognized from the image forming data, and the user's language indicated by the user language information and acquired by the acquirer 101 accord with each other. When the facsimile communication device 71 serves as the reception device also, the inclusion decider 102 decides, as in the case of the document reading device 5, whether the language of the characters recognized from the image forming data, and the user's language indicated by the user language information and acquired by the acquirer 101 accord with each other. Further, when the network I/F 91 serves as the reception device, the inclusion decider 102 analyzes the page description language of the image forming data stored in the image memory 32 or HDD 92, and decides whether the language of the characters recognized from the image forming data, and the user's language indicated by the user language information and acquired by the acquirer 101 accord with each other.

When the inclusion decider 102 decides that the user's language is included in the image forming data received by the reception device, the visibility decider 103 evaluates the level of visibility of the portion of the received image forming data described in the user's language, according to the predetermined criteria of inappropriateness. The visibility decider 103 may distinguish between the portion described in the user's language and the portion described in other languages, through the OCR of the image forming data, or through the analysis of the page description language of the image forming data, or may utilize the decision result provided by the inclusion decider 102.

For example, when the received image forming data includes the user's language and a language cognate to the user's language as shown in FIG. 6A, the visibility decider 103 decides that the predetermined inappropriateness is applicable.

The cognate language refers to a language that uses the characters of the similar type, or uses the same characters in common. For example, languages that use Kanji include Japanese, Chinese, and Taiwanese, which are the cognate languages. Languages that use the alphabets include English, German, and French, which are cognate languages.

In contrast, dissimilar languages are the languages that do not use the characters of the similar type, or do not use the same characters in common. For example, Japanese and English do not use the same characters, and are therefore dissimilar languages.

In addition, when the user's language and a language dissimilar to the user's language are described in each half of the received image forming data as shown in FIG. 6B, visibility decider 103 decides that the predetermined inappropriateness is not applicable. In this case, the Japanese and English are dissimilar languages, and these languages are separated so as to occupy approximately the same area as shown in FIG. 6B. Thus, these languages can be clearly distinguished, and therefore such a description is not regarded as inappropriate. No one reads an English sentence thinking it is written in Japanese, and vice versa, and therefore it is least likely that one chooses a wrong language to read.

When the portion of the received image forming data described in a language dissimilar to the user's language is larger than the portion described in the user's language, as shown in FIG. 7A, the visibility decider 103 decides that the predetermined inappropriateness is applicable. In this case, since the portion described in the dissimilar language is large, the user may overlook the description in the user's language. Therefore, such a layout is regarded as inappropriate.

Further, when portions described in a language dissimilar to the user's language, and portions described in the user's language are alternately located in the received image forming data, as shown in FIG. 7B, the visibility decider 103 decides that the predetermined inappropriateness is applicable. In this case, since the descriptions in the user's language and the descriptions in the dissimilar language are alternately located, the user may overlook the description in the user's language, and therefore such a layout is regarded as inappropriate.

When the visibility decider 103 decides that the predetermined inappropriateness is applicable, the form changer 104 changes the display form of the portion of the received image forming data described in the user's language, to a different form from the portion described in a different language (e.g., highlighted form). The form changer 104 may recognize the image forming data by OCR, or analyze the page description language of the image forming data, thereby recognizing the portion described in the user's language and the portion described in a different language, and generate the image forming data, in which the color of the characters of the portion described in the user's language has been changed. Alternatively, the form changer 104 may utilize the decision result provided by the inclusion decider 102.

The image forming device 12 forms the image based on the image forming data, in the display form changed by the form changer 104 (e.g., highlighted form), on the recording sheet P.

The color decider 107 decides whether the received image forming data represents a color image. More specifically, the color decider 107 automatically decides by automatic color selection (ACS), whether the received image forming data represents a monochrome or color image.

For example, the color decider 107 automatically decides whether the image forming data acquired through the reading operation of the document reading device 5 represents a color image, in other words whether the image forming data represents a color image including at least one chromatic color, by ACS.

The color decider 107 also decides whether the image forming data received by the facsimile communication device 71 or the network I/F 91, and stored in the image memory 32, represents a color image or a monochrome image, by ACS. To be more detailed, the color decider 107 calculates, through ACS, the ratio of color pixels to the pixels constituting the image region. The color decider 107 decides that the image forming data represents a color image, when the ratio of the color pixels is equal to or higher than a predetermined threshold, and decides that the image forming data represents a monochrome image, when the ratio of the color pixels is lower than the predetermined threshold.

The setting decider 108 decides whether the image forming device 12 is set to perform color printing or monochrome printing, to form the image from the image forming data on the recording sheet P For example, which of the color printing or monochrome printing is to be performed is stored in the HDD 92, according to the print setting made by the user. The setting decider 108 reads out the print setting stored in the HDD 92, thereby deciding which of the color printing or monochrome printing is to be performed.

When the visibility decider 103 decides that the predetermined inappropriateness is applicable, the color decider 107 decides whether the received image forming data represents a color image. Then when the color decider 107 decides that the image forming data does not represent a color image, and when the setting decider 108 decides that the printing is set to the color printing, the form changer 104 changes the display of the portion of the image forming data described in the user's language to color display. In contrast, when the color decider 107 decides that the image forming data represents a color image, or when the setting decider 108 decides that the printing is set to the monochrome printing, the form changer 104 does not change the display of the portion of the image forming data described in the user's language to color display.

Figure 5:
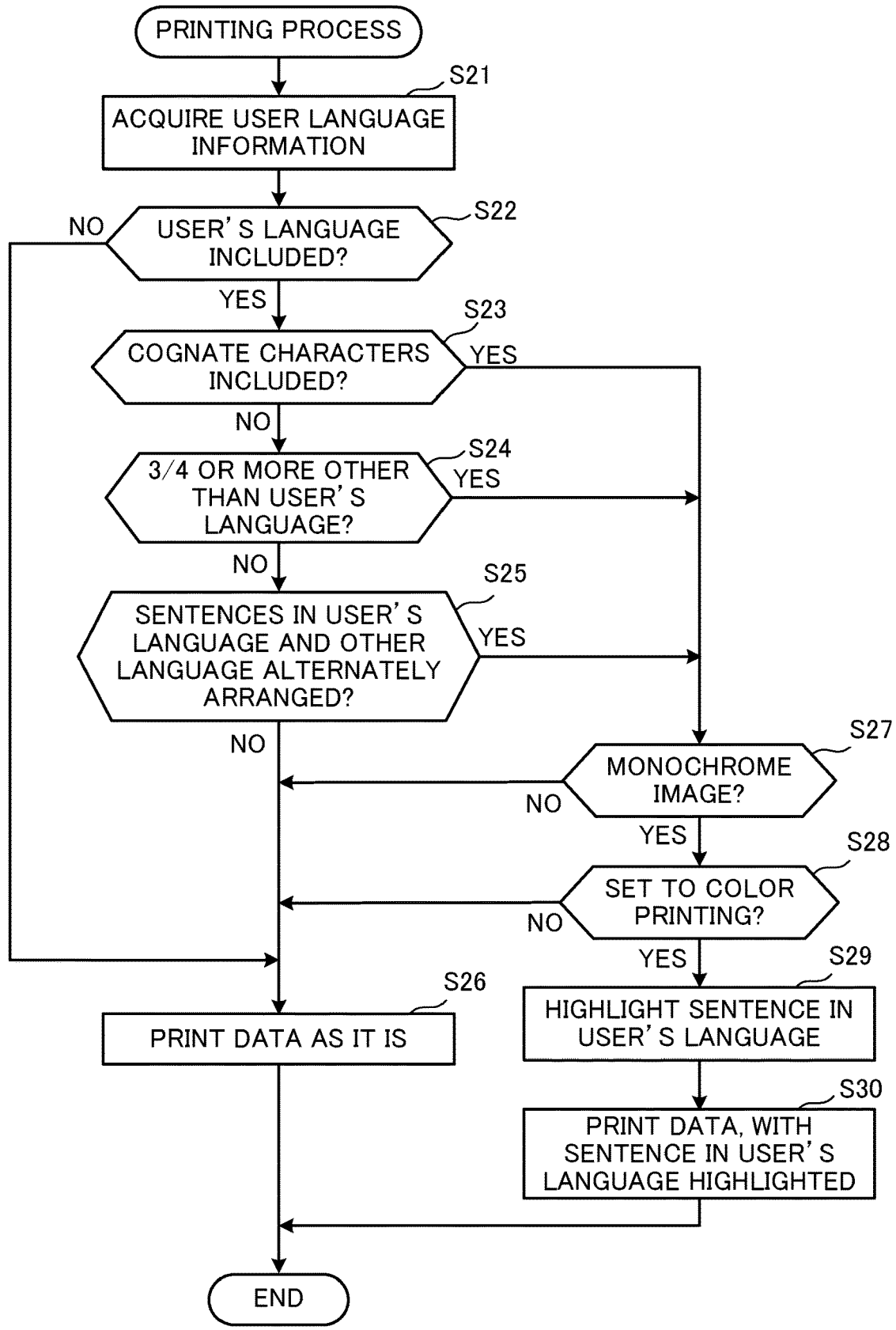
FIG. 5 is a flowchart showing a printing process performed by the image forming apparatus.

Hereunder, a printing operation performed by the image forming apparatus 1 will be described. FIG. 5 is a flowchart showing the printing operation performed by the image forming apparatus 1. The following description is based on the assumption that the user, namely Mr. A, has logged in in the image forming apparatus 1, that a source document to be printed is set on the document tray of the document feeding device 6, and that Mr. A has inputted the instruction to copy the source document (instruction to execute image forming operation), through the operation device 47.

The acquirer 101 acquires the user language information indicating the user's language (S21). In this embodiment, the acquirer 101 searches the user information storage region 92a to identify the user identification flag that is turned on, and acquires the user language information corresponding to the log-in information (e.g., user ID) of Mr. A who has logged in in the image forming apparatus 1, in other words acquires "Japanese" indicated by the language information of Mr. A.

The inclusion decider 102 decides whether the image forming data acquired by the document reading device 5 includes the user's language indicated by the user language information acquired by the acquirer 101 (S22). Since sentences in Japanese are written in the upper half of the original image forming data as shown in FIG. 6A, the inclusion decider 102 decides that the language of the user Mr. A, namely Japanese, is included in the original image forming data shown in FIG. 6A (YES at S22).

When the inclusion decider 102 decides that the user's language is included (YES at S22), the visibility decider 103 decides whether the original image forming data shown in FIG. 6A includes user's language, and a language cognate to the user's language (S23). Since Japanese sentences are written in the upper half of the image forming data, and Chinese sentences are written in the lower half of the same page in FIG. 6A, the visibility decider 103 decides that the image forming data includes the user's language, namely Japanese, and the language cognate thereto, namely Chinese (YES at S23). Then the color decider 107 decides whether the received image forming data represents a single-color (monochrome) image (S27). Since the Japanese sentences are written in black in the upper half of the image forming data, and the Chinese sentences are written in black in the lower half of the same page in FIG. 6A, the color decider 107 decides that the image forming data represents a monochrome image, in the example shown in FIG. 6A (YES at S27).

When the color decider 107 decides that the image forming data represents a monochrome image (YES at S27), the setting decider 108 decides whether the image forming device 12 is set to perform color printing or monochrome printing, to form the image from the image forming data on the recording sheet P (S28). In this embodiment, the setting of color printing is stored in the HDD 92. Accordingly, the setting decider 108 reads out the print setting stored in the HDD 92, thereby deciding that the printing is set to the color printing (YES at S28).

When the setting decider 108 decides that the printing is set to the color printing (YES at S28), the form changer 104 changes the portion of the image forming data described in the user's language to the color display form (S29). Thus, when the visibility decider 103 decides that the predetermined inappropriateness is applicable (YES at S23), the color decider 107 decides whether the received image forming data represents a color image (S27). Then when the color decider 107 decides that the image forming data represents a monochrome image (YES at S27), and when the setting decider 108 decides that the printing is set to the color printing (YES at S28), the form changer 104 changes the portion of the image forming data described in the user's language to the color display (S29). As result, as shown on the right in FIG. 6A, the Japanese sentences in the upper half of the image forming data are changed to red from black, and the Chinese sentences in the lower half of the same page remain black.

After S29, the image forming device 12 forms the image based on the image forming data, the display form of which has been changed by the form changer 104 (e.g., highlighted form), on the recording sheet P (S30). Accordingly, the image forming data of the highlighted form, shown on the right in FIG. 6A, is printed. After S30, the controller 100 finishes the printing operation.

In contrast, in the example shown in FIG. 7A, the image forming data includes Japanese sentences and English sentences, which are dissimilar to Japanese sentences. Accordingly, at S23 the visibility decider 103 decides that the image forming data does not include a set of the user's language, namely Japanese, and a cognate language (NO at S23). Then the visibility decider 103 decides whether the portion of the image forming data described in a language dissimilar to the user's language "Japanese", in this example "English", occupies equal to or more than three quarters of the entire image forming data (S24). In the case of FIG. 7A, the visibility decider 103 decides that the portion of the image forming data described in English, which is dissimilar to the user's language namely Japanese, occupies equal to or more than three quarters (YES at S24), and the operation proceeds to S27.

Here, the ratio of the portion of the image forming data described in a dissimilar language is not limited to three quarters. For example, the visibility decider 103 may decide whether the portion of the image forming data described in English, which is dissimilar to the user's language namely Japanese, is larger than the portion described in the user's language.

In the case of FIG. 7A, when the color decider 107 decides that the image forming data represents a monochrome image (YES at S27), and the setting decider 108 decides that the printing is set to the color printing (YES at S28), the portion of the image forming data described in the user's language is changed to the color display form (S29). As shown on the right in FIG. 7A, the Japanese sentences in the upper quarter of the image forming data are changed to red from black, and the English sentences in the lower three quarters of the same page remain black.

After S29, the image forming device 12 forms the image based on the image forming data, the display form of which has been changed to the highlighted form by the form changer 104, on the recording sheet P (S30). Accordingly, the image forming data of the highlighted form, shown on the right in FIG. 7A, is printed. After S30, the controller 100 finishes the printing operation.

In the example shown in FIG. 7B, the Japanese sentences and English sentences, which are dissimilar to Japanese, are alternately located in the image forming data, and the Japanese sentences and the English sentences each occupy a half of the region. Accordingly, at S24, the visibility decider 103 decides that the portion of the image forming data described in English, which is dissimilar to the user's language namely Japanese, is smaller than three quarters (NO at S24). Then the visibility decider 103 decides whether the Japanese sentences and English sentences, which are dissimilar to Japanese, are alternately located in the image forming data (S25). Since the Japanese sentences and English sentences, which are dissimilar to Japanese, are alternately located as shown in FIG. 7B, the visibility decider 103 decides accordingly (YES at S25), and proceeds to S27.

Here, although the user's language (e.g., Japanese) and the dissimilar language (e.g., English) are alternately located by sentences in the example shown in FIG. 7A, a different form may be adopted. For example, the visibility decider 103 may decide whether each line of the user's language "Japanese" and each line of the dissimilar language "English" are alternately located, in the image forming data.

In the case of FIG. 7B, when the color decider 107 decides that the image forming data represents a monochrome image (YES at S27), and the setting decider 108 decides that the printing is set to the color printing (YES at S28), the portion of the image forming data described in the user's language is changed to the color display form (S29). As shown on the right in FIG. 7B, the Japanese sentences in the image forming data are changed to red from black, and the English sentences in the same page remain black.

After S29, the image forming device 12 forms the image based on the image forming data, the display form of which has been changed to the highlighted form by the form changer 104, on the recording sheet P (S30). Accordingly, the image forming data of the highlighted form, shown on the right in FIG. 7B, is printed. After S30, the controller 100 finishes the printing operation.

In contrast, the image forming device 12 prints the original image forming data as it is, without highlighting any portion, when it is decided that the image forming data does not include the user's language (e.g., Japanese) (NO at S22), when it is decided that the user's language (e.g., Japanese) and a dissimilar language (e.g., English) are not alternately located in the image forming data (NO at S25), when the color decider 107 decides that the image forming data does not represent a monochrome image (NO at S27), or when the setting decider 108 decides that the printing is not set to the color printing (NO at S28) (S26). After S26, the controller 100 finishes the printing operation.

Hereunder, the operation with respect to the image forming data shown in FIG. 6B will be described. Since the image forming data includes Japanese and English sentences in the example shown in FIG. 6B, the visibility decider 103 decides that the image forming data does not include a set of the user's language, namely Japanese, and a language cognate thereto (NO at S23). Then, since the Japanese sentences and the English sentences each occupy a half of the region in the example shown in FIG. 6B, the visibility decider 103 decides that the portion of the image forming data described in English, which is dissimilar to the user's language namely Japanese, is smaller than three quarters (NO at S24). Then the visibility decider 103 decides that the Japanese sentences and English sentences are not alternately located in the image forming data shown in FIG. 6B (NO at S25). The image forming device 12 forms the image based on the image forming data shown in FIG. 6B, as it is.

According to this embodiment, the acquirer 101 acquires the user language information indicating the user's language. The inclusion decider 102 decides whether the image forming data includes the user's language indicated by the user language information acquired by the acquirer 101. When the inclusion decider 102 decides that the image forming data includes the user's language, the visibility decider 103 decides the level of visibility of the portion of the image forming data described in the user's language, depending on whether the predetermined inappropriateness is applicable. When the visibility decider 103 decides that the predetermined inappropriateness is applicable, the form changer 104 changes the portion of the image forming data described in the user's language to a different display form (e.g., highlighted form) from the remaining portion. The image forming device 12 forms the image based on the image forming data changed by the form changer 104, on the recording sheet P. Therefore, in the case of printing image forming data that includes sentences of a plurality of languages, the sentence in the user's language in the image forming data can be printed in a different display form (e.g., highlighted form) from the remaining portion, when the visibility of the sentence in the user's language is insufficient. When the visibility of the sentence in the user's language in the image forming data is sufficient, the image forming data is printed without highlighting the sentence in the user's language, and therefore an increase in consumption of the toner necessary for the highlighted printing (e.g., color toner) can be suppressed.

Now, when a document including sentences of a plurality of languages is to be printed, with the apparatus according to the foregoing background art, all the characters in the sentences in the language familiar to the user, in other words the user's language, have to be registered as the reserved word, in order to print the sentences in the user's language in a highlighted form. However, registering all the characters as the reserved word is a time-consuming job. Therefore, it is not easy to print the sentences in the user's language in a highlighted form, when printing a document including sentences of a plurality of languages.

With the apparatus according to the background art, in addition, the level of visibility of the portion of the image forming data described in the user's language is unable to be evaluated, and the sentences in the user's language are unable to be printed in a highlighted form, when the visibility of the sentence is insufficient, when the image forming data including sentences of a plurality of languages is to be printed.

In contrast, the arrangement according to this embodiment enables the sentences in the user's language to be printed in a different display form from the remaining portion of the document, when the visibility of the sentences in the user's language is insufficient, in the case of printing the image forming data including sentences of a plurality of languages.

When the received image forming data includes the set of the user's language and the language cognate thereto as shown in FIG. 6A, the visibility decider 103 decides that the predetermined inappropriateness is applicable. Accordingly, in the case of a document of low visibility, in which the user's language and a language cognate thereto are included, the sentences in the user's language can be printed in a different display form (e.g., highlighted form) from the remaining portion, which leads to upgraded visibility of the sentences in the user's language. Consequently, the user-friendliness of the apparatus can be improved.

When the portion of the received image forming data described in a language dissimilar to the user's language is larger than the portion described in the user's language as shown in FIG. 7A, the visibility decider 103 decides that the predetermined inappropriateness is applicable. Accordingly, in the case of a document of low visibility, in which the portion of the image forming data described in the language dissimilar to the user's language is larger than the portion described in the user's language, the sentences in the user's language can be printed in a different display form (e.g., highlighted form) from the remaining portion, which leads to upgraded visibility of the sentences in the user's language. Consequently, the user-friendliness of the apparatus can be improved.

In addition, when the portion of the received image forming data described in the user's language, and the portion described in a language dissimilar to the user's language are alternately located as shown in FIG. 7B, the visibility decider 103 decides that the predetermined inappropriateness is applicable. Accordingly, in the case of a document of low visibility, in which the portion of the image forming data described in the user's language, and the portion described in a language dissimilar to the user's language are alternately located, the sentences in the user's language can be printed in a different display form (e.g., highlighted form) from the remaining portion, which leads to upgraded visibility of the sentences in the user's language. Consequently, the user-friendliness of the apparatus can be improved.

When the log-in processor 106 permits the user to log in in the image forming apparatus 1, the acquirer 101 acquires the user language information associated with the log-in information from the user information storage region 92a. When the user language information is not stored in the user information storage region 92a and therefore the user language information is unable to be acquired, or when the log-in processor 106 has not permitted the user to log in in the image forming apparatus 1 (e.g., inputted log-in information does not accord with the log-in information stored in the user information storage region 92a), the acquirer 101 acquires the (i.e., operation device language information in the language displayed on the display device 473). Therefore, when the user is permitted to log in in the image forming apparatus 1, the sentence in the language of the user who has logged in can be printed in a different display form (e.g., highlighted form) from the remaining portion, which leads to upgraded visibility of the sentences in the user's language. Further, even when the user language information is unable to be acquired, or log-in in the image forming apparatus 1 is not permitted, the sentence in the language displayed on the operation device 47, which is the same as the user's language, can be printed in a different display form (e.g., highlighted form) from the remaining portion, which leads to upgraded visibility of the sentences in the user's language. Consequently, the user-friendliness of the apparatus can be improved.

When the visibility decider 103 decides that the predetermined inappropriateness is applicable, the form changer 104 (i) changes the display of a portion of the received image forming data described in the user's language to color display, when the color decider 107 decides that the image forming data does not represent a color image, and the setting decider 108 decides that the printing is set to the color printing, and (ii) keeps the display form of the portion of the image forming data described in the user's language unchanged, when the color decider 107 decides that the image forming data represents a color image, or when the setting decider 108 decides that the printing is set to the monochrome printing.

Accordingly, when the received image forming data does not represent a color image (i.e., represents a monochrome image), and the operation by the image forming device 12 to form the image based on the image forming data on the recording sheet P is set to color printing, the portion of the image forming data described in the user's language can be changed to color display, thus to be highlighted. In contrast, when the received image forming data represents a color image, or the operation by the image forming device 12 to form the image based on the image forming data on the recording sheet P is set to monochrome printing, the portion of the image forming data described in the user's language is not changed to color display. Such an arrangement prevents the portion described in the user's language, in the image forming data representing a color image, from being changed to the color display in vain, because changing the portion of the image forming data representing a color image to another color barely provides a highlighting effect. In addition, the monochrome print setting, set by the user, can be prevented from being forcibly changed to the color print setting against the intent of the user, and therefore unintended or undesired color printing can be prevented.

The disclosure is not limited to the foregoing embodiment, but may be modified in various manners. Although the embodiment refers to the case where the user's language is Japanese, a different language may be adopted. The user's language may be other than Japanese, such as Chinese, English, German, or French. For example, when Mr. B shown in FIG. 4 has logged in, the acquirer 101 acquires the user language information corresponding to Mr. B, in other words "English" indicated by the language information of Mr. B. Likewise, when Mr. C shown in FIG. 4 has logged in, the acquirer 101 acquires the user language information corresponding to Mr. C, in other words "Chinese" indicated by the language information of Mr. C.

In the foregoing embodiment, the form changer 104 changes the color of the characters, as an example of the change in display form of the portion of the image forming data described in the user's language (e.g., change to a highlighted form), with respect to the remaining portion. However, a different method may be adopted. For example, the form changer 104 may change the characters of the user's language to a bold or italic type, change the font of the characters, surround the sentence or characters with a frame, or change the background color of the region where the characters of the user's language are written.

Although the foregoing embodiment refers to the case where the source document to be printed is set on the document tray of the document feeding device 6, and the image forming data is acquired through the document reading operation of the document reading device 5, a different method may be adopted. For example, the image forming data may be received by the facsimile communication device 71.

Further, the image forming data may be acquired from a print job received by the network I/F 91. To be more detailed, when the network I/F 91 serves as the reception device, the inclusion decider 102 analyzes the page description language of the image forming data stored in the image memory 32 or HDD 92, to thereby decide whether the language of the characters in the image forming data, and the user's language indicated by the user language information acquired by the acquirer 101 accord with each other. When the inclusion decider 102 decides that the image forming data received by the network I/F 91 includes the user's language, the visibility decider 103 analyzes the page description language of the received image forming data to evaluate the level of visibility of the portion of the image forming data described in the user's language, and decides whether the predetermined inappropriateness is applicable. Then when the visibility decider 103 decides that the predetermined inappropriateness is applicable, the form changer 104 analyzes the page description language of the image forming data, to thereby change the portion of the received image forming data described in the user's language to a different display form (e.g., highlighted from) from the remaining language portion. Then the image forming device 12 forms an image based on the image forming data, the display form of which has been changed by the form changer 104 (e.g., highlighted form), on the recording sheet P Further, the configurations and arrangements according to the foregoing embodiments, described with reference to FIG. 1 to FIG. 7B, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a reception device that receives image forming data including sentences of a plurality of languages;
   a control device including a processor, and configured to act, when the processor executes a control program, as:
      an acquirer that acquires user language information indicating a predetermined language familiar to a user;
      an inclusion decider that decides whether the image forming data received by the reception device includes the user's language indicated by the user language information acquired by the acquirer;
      a visibility decider that decides, when the inclusion decider decides that the received image forming data includes the user's language, a level of visibility of a portion of the received image forming data described in the user's language, according to a predetermined criteria of inappropriateness; and
      a form changer that changes a display form of the portion of the received image forming data described in the user's language to a different display form, when the visibility decider decides that the visibility corresponds to the predetermined criteria of inappropriateness; and
   an image forming device that forms an image based on the image forming data in the display form changed by the form changer, on a recording medium.

2. The image forming apparatus according to claim 1, wherein the visibility decider decides that the predetermined inappropriateness is applicable, when the received image forming data includes the user's language and a language cognate to the user's language.

3. The image forming apparatus according to claim 1, wherein the visibility decider decides that the predetermined inappropriateness is applicable, when a ratio of a portion of the received image forming data described in a language dissimilar to the user's language is larger than a ratio of a portion described in the user's language.

4. The image forming apparatus according to claim 1, wherein the visibility decider decides that the predetermined inappropriateness is applicable, when a portion of the received image forming data described in a language dissimilar to the user's language, and a portion described in the user's language are alternately located in the received image forming data.

5. The image forming apparatus according to claim 1, wherein the visibility decider decides that the predetermined inappropriateness is not applicable, when the user's language and a language dissimilar to the user's language are separately located in each half of the received image forming data.

6. The image forming apparatus according to claim 1, further comprising:
   an operation device to be operated by the user, and including a display device that displays items related to operation in a language prepared in advance; and
   a storage device in which log-in information for logging in in the image forming apparatus, and user language information associated with the log-in information are stored in advance,
   wherein the control device further acts, when the processor executes the control program, as:
      an operation device language setter that sets a language to be displayed on the display device to a language indicated by operation device language information designated by the user through the operation device; and
      a log-in processor that permits the user to log in in the image forming apparatus, upon deciding that log-in information inputted by the user through the operation device accords with the log-in information stored in the storage device, and
   the acquirer acquires the user language information associated with the log-in information from the storage device, irrespective of a language indicated by the operation device language information designated by the user through the operation device, when the log-in processor permits the user to log in in the image forming apparatus, and acquires the operation device language information designated by the user through the operation device, when the user language information is unable to be acquired because the user language information is not stored in the storage device.

7. The image forming apparatus according to claim 1, wherein the control device further acts, when the processor executes the control program, as:
   a color decider that decides whether the received image forming data represents a color image; and
   a setting decider that decides whether the image forming device is set to perform color printing or monochrome printing, to form an image based on the image forming data on a recording sheet, and
   when the visibility decider decides that the predetermined inappropriateness is applicable, the form changer:
   (i) changes the display form of a portion of the received image forming data described in the user's language to color display being as the different display form, when the color decider decides that the image forming data does not represent a color image, and the setting decider decides that the printing operation is set to the color printing, and
   (ii) keeps the display form of the portion of the image forming data described in the user's language unchanged to the color display, when the color decider decides that the image forming data represents a color image, or when the setting decider decides that the printing operation is set to the monochrome printing.

* * * * *